June 24, 1930.  F. AYLER  1,768,304
TOWING BAR
Filed April 17, 1929
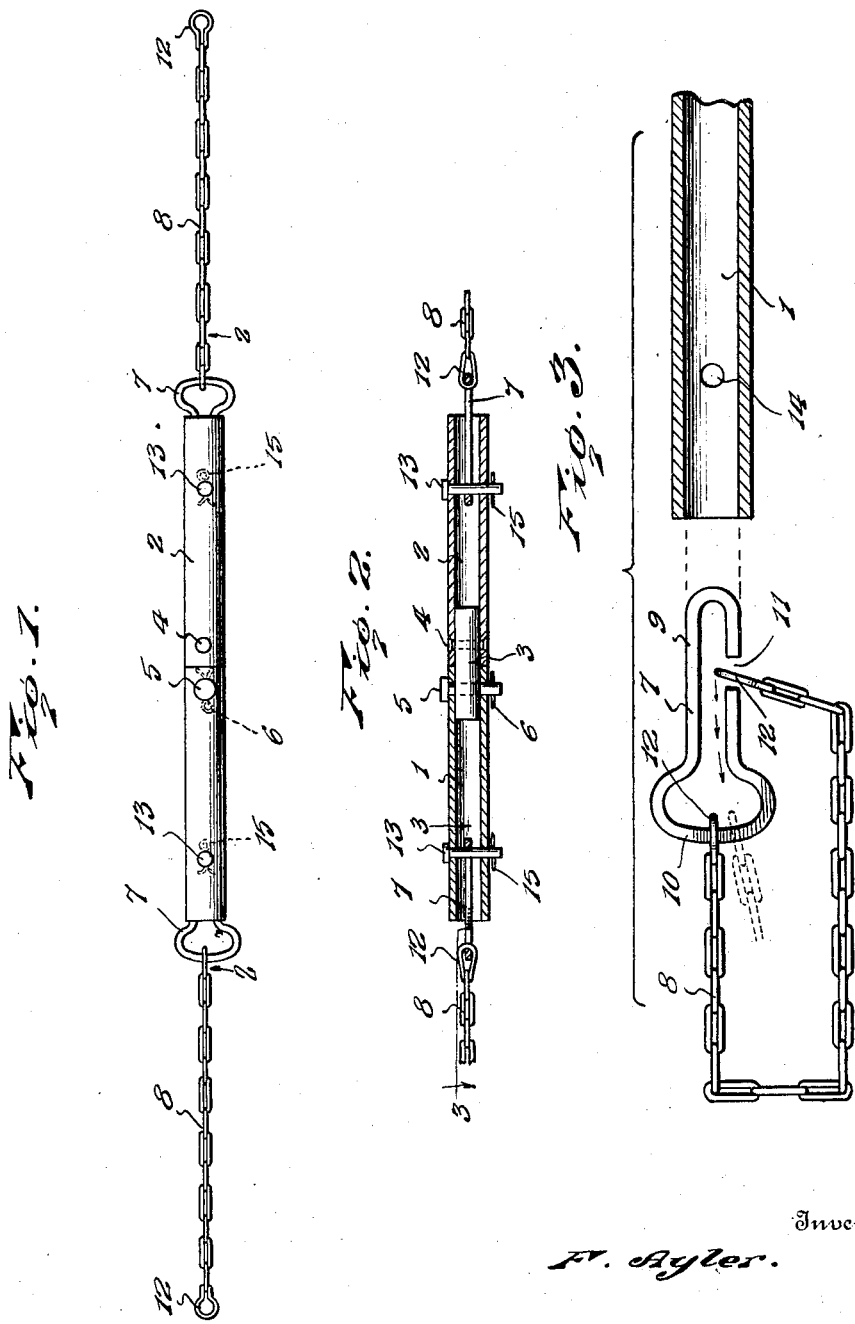
Inventor
F. Ayler.
By Lacey & Lacey, Attorneys Patented June 24, 1930

1,768,304

UNITED STATES PATENT OFFICE

FRANK AYLER, OF TACOMA, WASHINGTON

TOWING BAR

Application filed April 17, 1929. Serial No. 355,924.

This invention relates to automobile accessories and more particularly to a towing bar by means of which an automobile may be hitched to another and towed behind the same.

One object of the invention is to provide a towing bar formed in sections adapted to be releasably connected and thereby allowed to be taken apart so that the towing bar may be easily stowed beneath the seat of an automobile where it will be out of the way but readily accessible when needed.

Another object of the invention is to provide a device of this character in which chains or equivalent flexible elements are connected with the ends of the bar and adapted to be engaged about the rear axle of one automobile and the front axle of another and thereby allow the rear automobile to be easily towed.

Another object of the invention is to provide the towing bar with improved links at its ends for engagement by the chains and to allow the chains to be very easily connected with or detached from the links but at the same time prevent the chains from accidentally becoming detached.

The invention is illustrated in the accompanying drawing, wherein—

Figure 1 is a top plan view of the improved towing bar,

Fig. 2 is a longitudinal sectional view taken on the line 2—2 of Fig. 1, and

Fig. 3 is an enlarged fragmentary sectional view taken on the line 3—3 of Fig. 2 with the link released and moved out of the bar.

The improved towing bar includes companion sections 1 and 2 each of which is of a tubular formation and preferably consists of a section of pipe. The sections 1 and 2 of the tow bar may be of any length and diameter desired, and these sections have their ends cut straight across so that when assembled the inner ends of the two sections may have flat contacting engagement with each other. A core 3 consisting of a short bar of sufficient diameter to be snugly received in the two pipes or tubes from which the sections are formed is fitted into the section 2 where it is firmly secured by a rivet or equivalent fastener 4. This core projects from the section 2 and adjacent its free end is formed with a transversely extending opening adapted to register with alined openings formed in the section 1 so that a pin 5 may be passed through the same and thereby retain the section 1 in place about the portion of the core which projects from the section 2. After the pin or bolt 5 has been passed through the core and section 1 a cotter key or equivalent fastener 6 is passed through a small opening in the pin in order to prevent the pin from accidentally dropping out of place. It will thus be seen that the two sections of the tow bar may be securely connected when the device is to be used but when the device is not in use its sections may be easily separated and stowed beneath the seat of an automobile.

Each of the sections 1 and 2 receives in its outer end portion a link 7 which carries a chain 8 of such length that it may be wrapped about the axle of an automobile and thereby allow the tow bar to be connected with the front axle of a disabled automobile and rear axle of another by means of which the disabled machine is to be towed. Each link is formed as shown in Fig. 3 and consists of a strand or rod bent to define an elongated shank 9 having an enlarged head 10 at its outer end. The ends of the rod or strand from which the link is formed terminate in spaced relation to each other intermediate the length of the shank. thereby providing one side arm of the shank with a passage 11 through which end links or eyes 12 of the chain 8 may be passed and thereby allow the ends of the chains to be easily engaged with or disconnected from the links of the tow bar. It should be noted that the break 11 formed in the link is in such spaced relation to the ends of its shank that when the shank is thrust into an end portion of the bar the break will be closed by the walls of the bar and there will be no danger of the chain accidentally slipping out of proper engagement with the link. It should also be noted that the enlarged end portion or head 7 of the link limits its inward movement when thrust into the outer end portion of one of the tubular sections forming the bar. By this arrangement the links will be prevented from sliding inwardly beyond the position shown in Figs. 1 and 2 and when the securing pins 13 are passed through alined openings 14 formed in the outer end portions of the tubular sections of the bar and engaged through the inner end portions of the links 7, these links will be prevented from having sliding movement longitudinally in the tow bar and will be prevented from moving out of their proper positions relative to the bar. It also reduces loose play between the links and their securing pins and eliminates wear which might cause the pins 13 or inner end portions of the links to be quickly worn through. Cotter keys 15, similar to the key 6, are provided in order to retain the pins 13 in place but allow them to be removed when necessary.

When the tow bar is in use, its sections 1 and 2 are joined and the pins 13 removed so that the links 7 may be drawn outwardly. The chains 8 shall have one end already connected with the links 7 and, therefore, it is only necessary to engage the free end of each chain with its companion link, as shown in Fig. 3, after the chains have been wrapped about the front axle of a disabled automobile and rear axle of an automobile by means of which it is to be towed. After the chains that have had their two ends connected with the companion links, the shanks of the links are thrust into the outer end portions of the sections 1 and 2 of the bar and the pins 13 are replaced and secured by the cotter keys 15. The two automobiles will then be joined by the tow bar and a disabled automobile may be easily towed. When it is desired to release the tow bar from the automobiles, it is merely necessary to remove the pins 13 thereby releasing the links and allowing them to be withdrawn so that the chains may be detached from the links and drawn out of engagement with the axles of the automobiles. The links with one end of a chain attached to each are again fitted into the ends of the tow bar and secured by the pins 13 and the pin 5 can be removed so that the two sections of the bar will be released and allowed to be stored beneath the seat of an automobile or in any other small space.

Having thus described the invention, I claim:

1. A towing device comprising a bar having an open end, an open link loosely received in the end portion of said bar and projecting outwardly therefrom and formed with a passage adjacent its inner end, a fastener releasably connecting the link and bar with the bar disposed about the link and closing the passage thereof, and a flexible member having its ends removably engaged through the link.

2. A towing device comprising a bar having open ends, open links loosely received in the end portions of said bar and projecting outwardly therefrom, said links being slidable into and out of the bar and having their outer ends enlarged to limit inward movement of the links, removable fasteners extending through the end portions of said bar and inner ends of said links to releasably secure the links, and flexible members having their ends removably engaged through said links.

3. A towing device comprising a bar having open ends, links loosely received in the end portions of said bar and projecting outwardly therefrom, each link consisting of an elongated loop having spaced side arms, one side arm being formed with a passage intermediate its length concealed when the link is fitted into the bar, removable fasteners passed through the bar and inner end portions of said links to releasably secure the links to the bar, and flexible members having eyes at their ends loosely engaged with the outer end portions of said links and movable into and out of engagement therewith through their side passages when the links are released from the bar.

4. A towing device comprising a bar having open ends, links loosely received in the end portions of said bar and projecting outwardly therefrom, each link consisting of an elongated loop having spaced side arms, one side arm being formed with a passage intermediate its length concealed when the link is fitted into the bar, removable fasteners passed through the bar and inner end portions of said links to releasably secure the links to the bar, and flexible members having eyes at their ends loosely engaged with the outer ends of said links, the outer end portions of the links being spread to limit movement thereof into the ends of the bar.

5. A towing device comprising a bar consisting of sections to be disposed in end to end relation to each other, the said sections being tubular in formation, a core firmly secured in a set position in one section and projecting from its inner end, the projecting portion of said core being received in the inner end portion of the second section, said sections having their ends contacting when the second section is fitted upon the core, a removable fastener passed through the inner end portion of the second section and the portion of the core received therein to releasably retain the sections in operative engagement with each other, and flexible members connected with the outer ends of said sections.

In testimony whereof I affix my signature.

FRANK AYLER. [L. S.]